Patented Jan. 3, 1933

1,892,801

UNITED STATES PATENT OFFICE

FRANKLIN E. KIMBALL, OF LONG BEACH, CALIFORNIA

PROCESS OF REFINING GASOLINE

No Drawing. Application filed April 23, 1931. Serial No. 532,280.

This invention relates to a method of refining crude gasoline by means of an aqueous solution of calcium chloride containing magnesium chloride and has for its object to effect less loss of gasoline in refining and to render the process more expeditious and cheaper.

In processes employing the use of an aqueous solution of calcium chloride for treating hydrocarbon vapors, hydrochloric acid gas is liberated by hydrolysis of magnesium chloride present in technical solutions as an impurity. In the presence of this nascent hydrochloric acid gas there is induced a synthesis of gums from unstable constituents of the hydrocarbon vapors. The hydrocarbon vapors are partially cooled and partially condensed by the calcium chloride solution. The resulting hydrocarbon liquid contains the aforesaid synthesized gums and becomes commingled with the calcium chloride solution and thereby removes the gums from the vapors. Large quantities of technical calcium chloride solution are required for this purpose as the magnesium chloride content quickly becomes exhausted and the solution becomes ineffective.

In processes employing the use of an aqueous solution of magnesium chloride for treating hydrocarbon vapors it is found that the magnesium chloride solution removes valuable gasoline constituents from the hydrocarbon vapors. Under such conditions of temperature and pressure that valuable gasoline constituents would not be lost in this way, it is found that a water solution of magnesium chloride does not exist and the process is inoperative.

In my process valuable gasoline constituents are not removed by the treating solution. Impractical quantities of the reagent are not required. To effect this result I employ the use of a water solution of a mixture of the chlorides. Aqueous calcium chloride has the property of forming water solutions of relatively high atmospheric boiling-point temperatures. Aqueous magnesium chloride has the property of hydrolyzing at the boiling-point temperature of its solutions. Both results are in solutions of the chlorides of calcium and magnesium in admixture with each other.

With the foregoing preliminary explanation of the new results effected, I will describe the preferred embodiment of my process as an example of a practical illustration thereof. It is to be understood that my invention is not limited or restricted to the precise concentrations, quantities, proportions, temperatures and pressures incurred in applying the particular illustration hereby thus described. It is also to be understood that my invention is not limited or restricted to the continuous form of operation which is portrayed in the illustration that will be described as an example of the process.

In the application of my process to hot gasoline vapors the synthesis of gums from unstable constituents of the gasoline vapors is effected at a temperature of approximately 300 degrees Fahrenheit by contacting the vapors with a water solution containing from 3 to 5% of magnesium chloride and from 60 to 70% of calcium chloride. Steam is preliminarily supplied to the gasoline vapors to minimize their evaporative effect upon the brine solution. The rate of feed of the steam and of the brine solution from time to time are readjusted and varied to control the strength of the brine solution in the contacting apparatus. At all times a minimum of twenty pounds of the brine solution is supplied for each barrel of gasoline being supplied. The hot gasoline vapors together with steam and a hot water solution of magnesium and calcium chlorides are continuously supplied to a suitable contacting apparatus. Brine sludge is continuously withdrawn from the apparatus. The withdrawn gasoline vapors are then continuously passed through the interstices between lumps of limestone. Hydrochloric acid gas, liberated from the brine solution by the hot vapors, now becomes neutralized by the limestone forming calcium chloride solution which runs down off the lumps of limestone and is withdrawn beneath. The vapors are then withdrawn from the limestone and passed through a fractionating tower where high boiling-point constituents are continuously removed. The withdrawn vapors are then continuously cooled and condensed to form gasoline.

Although I have herein shown and described only one process of refining gasoline embodying my invention, it is to be understood that various changes and modifications may be made herein without departing from the spirit of the invention and the spirit and scope of the appended claims.

I claim:

1. A method of refining gasoline comprising, heating mineral oil thereby forming hot gasoline vapors, passing the vapors into contact with a hot maintained treating mixture of water, calcium chloride and magnesium chloride, separating the vapors from the treating mixture, withdrawing the vapors, passing the vapors through a fractionating tower thereby removing high boiling-point constituents from the vapors, and cooling the withdrawn vapors to condense the vapors to form gasoline.

2. A method of refining gasoline comprising, heating mineral oil thereby forming hot gasoline vapors, passing the vapors into contact with a hot maintained treating mixture of water, calcium chloride and magnesium chloride at a temperature of approximately 300 degrees Fahrenheit and containing from 3 to 5% of magnesium chloride and 60 to 70% of calcium chloride, separating the vapors from the treating mixture, withdrawing the vapors, passing the vapors through a fractionating tower thereby removing high boiling-point constituents from the vapors and cooling the withdrawn vapors to condense the vapors to form gasoline.

3. A method of refining gasoline comprising, heating mineral oil thereby forming hot gasoline vapors, passing the vapors into contact with a hot maintained treating mixture of water, calcium chloride and magnesium chloride, supplying to the treating mixture a hot mixture of water, calcium chloride and magnesium chloride, withdrawing from the treating mixture a mixture of water, calcium chloride and magnesium chloride, separating the vapors from the treating mixture, withdrawing the vapors, passing the vapors through a fractionating tower thereby removing high boiling-point constituents from the vapors and cooling the withdrawn vapors to condense the vapors to form gasoline.

4. A method of refining gasoline comprising, heating mineral oil thereby forming hot gasoline vapors, passing the vapors into contact with a hot maintained treating mixture of water, calcium chloride and magnesium chloride at a temperature of approximately 300 degrees Fahrenheit and containing from 3 to 5% of magnesium chloride and 60 to 70% of calcium chloride, supplying to the treating mixture a hot mixture of water, calcium chloride and magnesium chloride, withdrawing from the treating mixture a mixture of water, calcium chloride and magnesium chloride, separating the vapors from the treating mixture, withdrawing the vapors, passing the vapors through a fractionating tower thereby removing high boiling-point constituents from the vapors and cooling the withdrawn vapors to condense the vapors to form gasoline.

FRANKLIN E. KIMBALL.